United States Patent [19]

Schaer

[11] Patent Number: 4,543,606
[45] Date of Patent: Sep. 24, 1985

[54] SECURITY DEVICE FOR CABLE TELEVISION

[76] Inventor: Robert H. Schaer, 3181-66th Way N., St. Petersburg, Fla. 33710

[21] Appl. No.: 489,341

[22] Filed: Apr. 28, 1983

[51] Int. Cl.$^4$ .................. H04N 7/16; H04K 1/00; H01R 13/44
[52] U.S. Cl. ...................................... 358/114; 339/37
[58] Field of Search .......................... 358/114; 339/37; 200/42 R, 42 T

[56] References Cited

U.S. PATENT DOCUMENTS

| | | | |
|---|---|---|---|
| 4,097,894 | 6/1978 | Tanner et al. | 358/114 |
| 4,149,158 | 4/1979 | Iwaoka et al. | 358/114 |
| 4,232,396 | 11/1980 | Grimes | 358/114 |
| 4,313,132 | 1/1982 | Doles et al. | 358/114 |

Primary Examiner—S. C. Buczinski
Assistant Examiner—Burton J. Carniol
Attorney, Agent, or Firm—Ronald E. Smith

[57] ABSTRACT

An electrical circuit that interrupts normal operation of a cable television channel selection box responsive to unauthorized entry into the box. A closure means is mounted about its periphery by a plurality of screw members that must be removed in a predetermined sequence to avoid disabling the box. A power source provides current through a bypass means in the form of a normally closed switch means as long as the closure means remains closed, but removal of a fastening means not associated with said bypass means prior to interruption of said current results in de-activation of the channel selection box.

4 Claims, 5 Drawing Figures

SECURITY DEVICE FOR CABLE TELEVISION

BACKGROUND OF THE INVENTION

1. Field of the Invention

This invention relates, generally, to devices of the type designed to prevent unauthorized entry into cable television channel selection boxes, and more specifically relates to a device employing electrical circuitry to disable the channel selection box if the closure means of said box is removed in a manner indicating that such removal is unauthorized.

2. Description of the Prior Art

A search of United States Patents that was conducted prior to the filing of this disclosure located the following patents in the general field of this invention:

| Patentee | U.S. Pat. No. | Date of Issue |
| --- | --- | --- |
| Tanner et al. | 4,097,894 | 06/27/78 |
| Iwaoka et al. | 4,149,158 | 04/10/79 |
| Grimes | 4,232,396 | 11/04/80 |
| Doles et al. | 4,313,132 | 01/26/82 |

The field of search included Class/sub-class 358/114-124.

Individuals throughout the United States who subscribe to cable television services have learned that the channel selection boxes provided by the cable television service companies is easily tampered with. It has become widespread knowledge among children, for example, that Home Box Office, Showtime, The Movie Channel, and other premium subscription services, may be obtained free of charge by the simple expedient of removing the lid from the channel selection boxes, and placing toothpicks in appropriate locations. Other methods have been designed as well for the interception of signals that have not been paid for. As this practice multiplies, the cable television industry will be wrongfully deprived of large amounts of revenue. Accordingly, honest consumers who do not tamper with their channel selection boxes will be billed at increasingly higher rates to subsidize those who have elected to receive the services without paying for the same.

An economical to install system is needed that will protect channel selection boxes against unauthorized entry, but the needed system does not appear in the prior art.

SUMMARY OF THE INVENTION

The longstanding but heretofore unfulfilled need for a system of the type discerned to be needed is now provided in the form of a channel selection box having a closure member or lid that is fixedly secured to the box about its periphery by a plurality of screw members that form a part of an electrical circuit so that removal of said screw members in a sequence other than a predetermined sequence will effect the disabling of the channel selection box. Specifically, the invention provides a power source that sends current through a normally closed switch when the closure means is in its normally closed configuration. This normally closed switch is associated with a particular one of the fastening means that secures the closure means so that authorized personnel will be aware that such particular fastening means must be the first fastening means removed from the closure means when it is desired to enter the box for authorized repairs. Those who are unaware of which fastening means is associated with said normally closed circuit will most likely commence their unauthorized entry into the box by removing a fastening means that is associated with a unit disabling means, thereby disabling the box. To reactivate their cable service, the party who has attempted an unauthorized entry will be required to call the cable service company, thereby providing incriminating evidence.

It is therefore seen to be the primary object of this invention to provide an anti-tamper device usable in connection with channel selection boxes.

A closely related object is to provide such a device that can be retrofit into existing boxes or provided as original equipment in newly manufactured boxes.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

DETAILED DESCRIPTION OF THE PREFERRED EMBODIMENT

Figure 1:
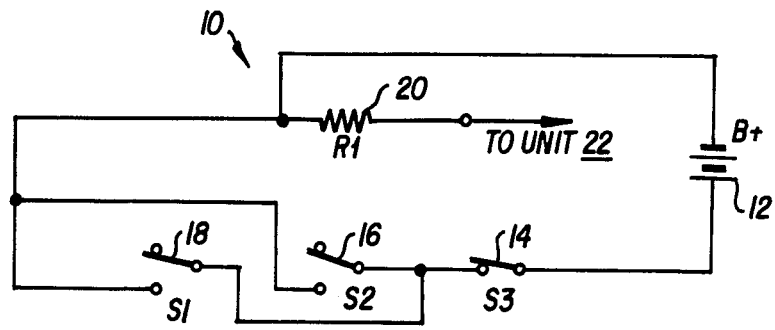
FIG. 1 is a schematic diagram showing a circuit capable of accomplishing the inventive objects.

Referring now to FIG. 1, it will there be seen that an electrical circuit that will accomplish the inventive purpose is indicated by the reference numeral 10 as a whole. The circuit includes a power source 12 that may be provided in the form of a nine-volt battery, a normally closed switch 14, a normally open switch 16, a normally open switch 18, a resistor 20, and a sending unit 22.

It should be understood from the outset that a typical channel selection box has a high plurality of screw members disposed about its periphery to maintain its closure means in position. In the example of FIG. 1, the circuitry shown would be provided in the context of a channel selection box having only three screw members, and it should therefore be understood that such circuit is for illustrative purposes only.

If an unauthorized entry into the box is attempted, a screw member associated with either switch 16 or 18 will allow current from power source 12 to flow through switch 14 and the switch 16 or 18 closed by removal of its associated screw member, into a sending unit 22 through resistor 20. The sending unit 22 interrupts power to the channel selection box or interrupts power to the television. Thus, operation of the television can be restored only by authorized repair personnel, as desired.

When an authorized entry into the box must be made, the repair personnel will be cognizant that, in this example, a screw member associated with switch 14 must be removed before any other screw members are removed. By removing the screw member associated with normally closed switch 14, the circuit from the battery of other power source 12 will be interrupted so that current cannot flow to the sending unit when switches 16 or 18 are subsequently removed.

Figure 2:
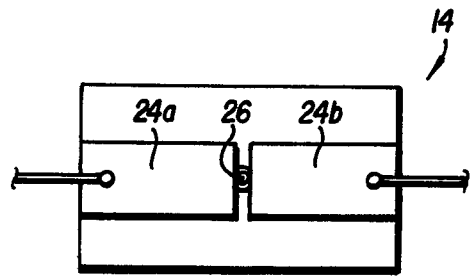
FIG. 2 is a top plan view of one method of providing a normally closed circuit.
Figure 3:
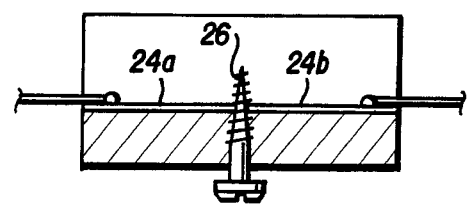
FIG. 3 is a side elevational view of the means shown in FIG. 2.

Referring now to FIG. 2, it will there be seen that switch 14 is inventively provided in the form of a brass or copper (or other conductive material) strip 24 that is broken as shown. A screw member 26 is employed to bring the separate strip portions 24a and 24b into electricl communication with one another, as perhaps better shown in FIG. 3.

Figure 4:
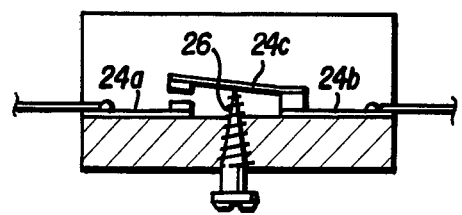
FIG. 4 is a side elevational view showing one means for providing a normally open circuit.
Figure 5:
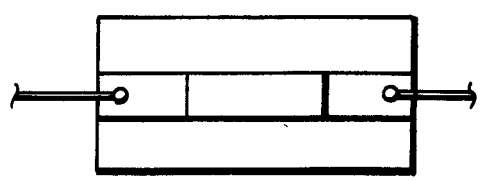
FIG. 5 is a top plan view of the means shown in FIG. 4.

FIG. 4 shows how switches 16 and 18 could be provided to be maintained in their normally open configuration. A resilient terminal 24c is spaced out of contact with strip 24 by a screw member 26, as shown. Clearly, due to the resiliency of terminal 24c, upon removal of screw member 26, electrical contact will be made between the conducting members 24a and 24b and the sending unit 22 will be activated as aforesaid.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

That which is claimed is:

1. A cable television channel selection box anti-tamper device, comprising, in combination,
    a channel selection box,
        said channel selection box having reception means contained therein to allow reception by a cable television subscriber of a plurality of electromagnetic signals,
        said reception means further having pre-set channel restricting means to prevent reception of predetermined signals from among said plurality of signals,
    said channel selection box having a closure means to bar access by a subscriber to said reception and restricting means,
    a plurality of at least two removable fastening means to detachably secure said closure means to said selection box so that authorized personnel may gain access to said reception and restricting means,
    a selection box disabling means,
    a disabling means bypass means,
    said disabling means and said bypass means operatively connected to said fastening means such that removal of the fastening means operatively connected to the bypass means must be accomplished prior to the removal of the fastening means operatively connected to the disabling means to avoid disabling said reception and restricting means.

2. The device of claim 1, wherein said fastening means are provided in the form of first and second screw members operatively connected to said disabling means and to said bypass means respectively, so that removal of said second screw member must be accomplished prior to the removal of said first screw member to avoid said disabling.

3. The device of claim 2, wherein said disabling means is provided in the form of a sending unit means that provides a path to ground for current intended to operate said reception and restricting means.

4. The device of claim 3, wherein said disabling means and said bypass means are provided in the form of electrical circuitry having a power source, and wherein said disabling and bypass means are electrically connected in parallel relation to said power source and to one another, said bypass means being provided in the form of a normally closed switch and said disabling means being provided in the form of at least one normally open switch so that when said closure means is in its closed configuration, a circuit is completed through said bypass means, but when a fastening means associated with said disabling means is removed prior to the removal of a fastening means associated with said bypass means, current flows through said sending unit means and disables said reception and restricting means.

* * * * *